UNITED STATES PATENT OFFICE.

MORITZ ULRICH, OF ELBERFELD, GERMANY, ASSIGNOR TO FARBENFABRIKEN VORM.
FRIEDR. BAYER & CO., OF ELBERFELD, GERMANY, A CORPORATION OF GERMANY.

ANTIFOULING PAINT AND VARNISH.

No. 906,668.      Specification of Letters Patent.      Patented Dec. 15, 1908.

Application filed August 4, 1908. Serial No. 446,939.

*To all whom it may concern:*

Be it known that I, MORITZ ULRICH, doctor of philosophy, chemist, citizen of the German Empire, residing at Elberfeld, Germany, Kingdom of Prussia, have invented new and useful Improvements in Antifouling Paints and Varnishes, of which the following is a specification.

It is known that the alkali salts of dinitro-ortho-cresol (see British Letters Patent No. 3301 A. D. 1892) commercially called "antinonnin" are used in aqueous solutions, sometimes with addition of soap, for destroying insects, fungi (polyporus destructor etc.), dry-rot, but as they are insoluble in organic solvents they cannot be used for preparing spirit or benzene varnishes, paints for bottoms of ships or for similar purposes, in which a preserving action is desirable. I have now found, that the free dinitro-ortho-cresol can be used for this purpose and preparations suitable as coatings, paints or varnishes can thus be obtained which are remarkable for their good preserving properties. The free dinitro-ortho-cersol is soluble in alcohol, benzene, ligroin, linseed-oil, tar-oil or other solvents or agglutinants used for the preparation of such coatings, paints or varnishes, and other suitable substances may be dissolved in these solutions without causing precipitation of the dinitro-ortho-cresol.

A useful preparation can be obtained for instance by dissolving 1 part of dinitro-ortho-cresol in 25 parts of a spirit varnish but the quantities and the solvents may be varied without altering thereby the nature of the invention.

Having now particularly described and ascertained the nature of my invention and in what manner the same is to be performed, I declare that what I claim is:—

As a new article of manufacture a varnish comprising dinitro-ortho-cresol in conjunction with suitable solvents, substantially as described.

In testimony whereof I have hereunto set my hand in the presence of two subscribing witnesses.

MORITZ ULRICH. [L. S.]

Witnesses:
   OTTO KÖNIG,
   WM. WASHINGTON BRUNSWICK.